United States Patent
Ahrens et al.

(10) Patent No.: US 6,230,265 B1
(45) Date of Patent: May 8, 2001

(54) METHOD AND SYSTEM FOR CONFIGURING RESOURCES IN A DATA PROCESSING SYSTEM UTILIZING SYSTEM POWER CONTROL INFORMATION

(75) Inventors: George Henry Ahrens, Pflugerville; John C. Kennel, Austin; Jayeshkumar M. Patel, Austin; Kurt Paul Szabo, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,513

(22) Filed: Sep. 30, 1998

(51) Int. Cl.$^7$ ..................................................... G06F 15/17
(52) U.S. Cl. .................. 713/1; 714/100; 714/14
(58) Field of Search ........................... 713/1, 2; 714/100, 714/14

(56) References Cited

U.S. PATENT DOCUMENTS

| | | | |
|---|---|---|---|
| 5,450,570 | * 9/1995 | Richek et al. | 395/500 |
| 5,675,794 | * 10/1997 | Meredith | 713/1 |
| 5,845,136 | * 12/1998 | Babcock | 713/300 |
| 5,935,252 | * 8/1999 | Berglund et al. | 713/300 |
| 5,964,871 | * 10/1999 | Hester et al. | 713/1 |
| 5,982,899 | * 11/1999 | Probst | 380/25 |

\* cited by examiner

Primary Examiner—Thomas Black
Assistant Examiner—Mary Wang
(74) Attorney, Agent, or Firm—Leslie A. VanLeeuwen; Felsman, Bradley, Vaden, Gunter & Dillon, LLP

(57) ABSTRACT

A data processing system includes a plurality of components, a power control network, processing resources, and a memory that contains initialization firmware. At system startup, the power control network initiates supply of power to the plurality of components and collects information regarding which components are supplied power. In addition, the initialization firmware initializes the plurality of components to establish a configuration. If an ambiguity in the configuration arises, the initialization firmware resolves the ambiguity utilizing the information collected by the power control network.

19 Claims, 2 Drawing Sheets

METHOD AND SYSTEM FOR CONFIGURING RESOURCES IN A DATA PROCESSING SYSTEM UTILIZING SYSTEM POWER CONTROL INFORMATION

BACKGROUND OF THE INVENTION

1. Technical Field

The present invention relates in general to data processing and, in particular, to the configuration of resources in a data processing system. Still more particularly, the present invention relates to a method and system for configuring resources in a data processing system utilizing system power control information.

2. Description of the Related Art

A conventional data processing system undergoes a series of initialization procedures at system startup. At startup or cold boot, each of the various hardware components of the data processing system first performs its own internal reset procedures to obtain a known stable state. Once these hardware reset procedures have completed successfully, firmware is generally executed by one or more processors in the data processing system to complete the initialization process. In many computer systems, this firmware includes Power On Self Test (POST) software that surveys and performs sanity checks on system hardware, a Basic Input Output System (BIOS) that interfaces the processor(s) to key peripherals such as a keyboard and display device, and an operating system loader (bootstrap) program that launches execution of a selected operating system. These basic firmware procedures, which are often bundled together in a startup ROM or non-volatile random access memory (NVRAM), together enable the data processing system to obtain an operating state at which the data processing system is available to execute a user's applications.

During the initialization of the data processing system, the system firmware may not be able to determine with certainty which resources are present within the data processing system or may not be able to configure identified resources due to a hardware malfunction, an improper, damaged or missing physical connection, etc. Resources that the firmware cannot verify as present and correctly connected to the data processing system cannot be configured by the firmware and therefore are not available for access by the operating system. Because of ambiguities regarding whether or not certain resources are present in the data processing system, the firmware may also be unable to provide an appropriate error message explaining or indicating the unavailability of a resource. As should thus be apparent, it would be useful and desirable to provide an improved method for configuring resources during system startup that permits resource ambiguities to be resolved during startup.

SUMMARY OF THE INVENTION

In accordance with the present invention, a data processing system includes a plurality of components, a power control network, processing resources, and a memory that contains initialization firmware. At system startup, the power control network initiates supply of power to the plurality of components and collects information regarding which components are supplied power. In addition, the initialization firmware initializes the plurality of components to establish a configuration. If an ambiguity in the configuration arises, the initialization firmware resolves the ambiguity utilizing the information collected by the power control network.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
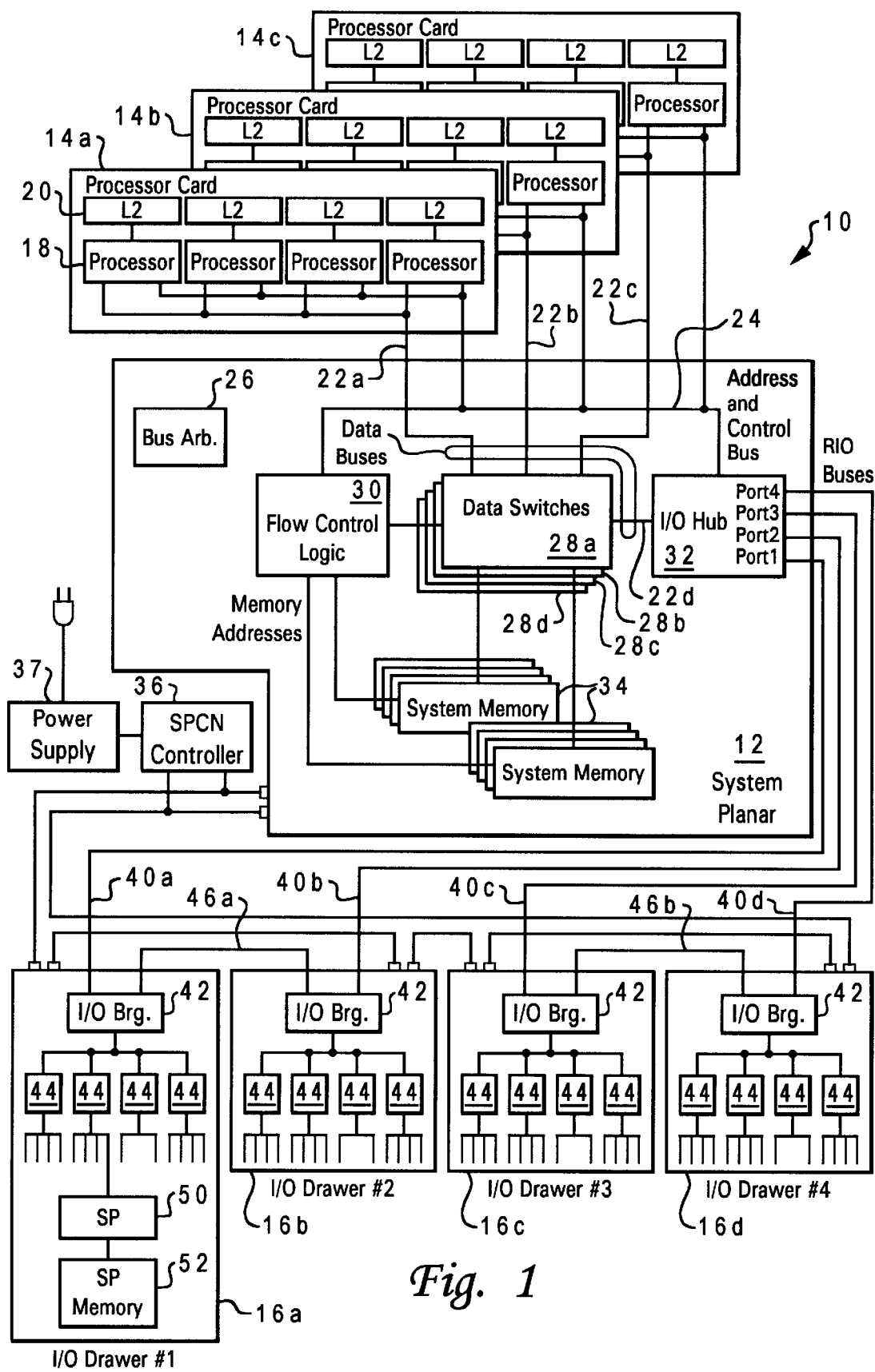
FIG. 1 depicts an illustrative embodiment of a data processing system with which the method and system of the present invention may advantageously be utilized.

With reference now to the figures and in particular with reference to FIG. 1, there is depicted a block diagram of an illustrative embodiment of a data processing system with which the present invention may advantageously be utilized. The illustrative embodiment depicted in FIG. 1 is a workstation or server computer system; however, as will become apparent from the following description, the present invention may also be applied to any other data processing system.

As illustrated in FIG. 1, data processing system 10 includes a system planar 12 coupled to one or more processor cards (in this case processor cards 14a–14c) and one or more input/output (I/O) drawers (in this case I/O drawers 16a–16d). In the depicted embodiment, each processor card 14 carries four general purpose processors 18 that each have an on-chip level one (L1) be cache (not illustrated) and an associated level two (L2) cache 20 that provide low latency storage for instructions and data. The processors 18 on each processor card 14 are all connected to address and control bus 24 and to an associated one of data buses 22a–22c.

As illustrated, system planar 12 includes a bus arbiter 26 that regulates access to address and control bus 24 by processors 18, as well as flow control logic 30 and I/O hub 32, which are each connected to address and control bus 24. Flow control logic 30 is further connected to dual-ported system memory 34 and data switches 28a–28d, and I/O hub 32 is further connected to data switches 28 by data bus 22d and to each of I/O drawers 16a–16d by a respective one of primary remote I/O (RIO) buses 40a–40d. Address transactions issued on address and control bus 24 are received by both flow control logic 30 and I/O hub 32. If an address transaction specifies an address associated with a location in system memory 34, flow control logic 30 forwards the address to system memory 34 as an access request. Alternatively, if the address transaction specifies a memory mapped I/O address associated with an I/O device contained in one of I/O drawers 16a–16d, I/O hub 32 routes the address transaction to the appropriate I/O drawer 16 via its primary RIO bus 40. Flow control logic 30 also supplies control signals to data switches 28 to control the flow of data transactions between processor cards 14 and system memory 34 and I/O hub 32.

Referring now to I/O drawers 16a–16d, each I/O drawer 16 contains an I/O bridge 42 that is directly connected to I/O hub 32 by a respective primary RIO bus 40 and is coupled either directly or indirectly to I/O hub 32 via a secondary RIO bus 46 (e.g., either secondary RIO bus 46a or 46b).

That is, in embodiments of data processing system 10 in which only a single I/O drawer 16 is installed, I/O bridge 42 is directly connected to I/O hub 32 by both a primary RIO bus 40 and a secondary RIO bus 46. In other embodiments in which multiple I/O drawers 16 are installed, each I/O drawer 16 is connected to I/O hub 32 by a single primary RIO bus 40 and is connected to another I/O drawer 16 through a secondary RIO bus 46. Thus, I/O hub 32 has redundant paths through which it can communicate to each installed I/O drawer 16. Each I/O bridge 42 is connected to up to four peripheral component interconnect (PCI) bus controllers 44, which each supply connections for up to four PCI devices. As shown in FIG. 1, the PCI devices installed in I/O drawer 16a include service processor 50, which has an associated service processor (SP) memory 52. Other PCI devices that may be attached to PCI controllers 44 of I/O drawers 16a–16d include small computer system interface (SCSI) adapters, local area network (LAN) adapters, etc.

As shown, data processing system 10 also includes system power control network (SPCN) controller 36, which receives input power from an external power supply 37 and, following power on, distributes operating power to all the components of data processing system 10, as discussed further below. As illustrated, the system power control network includes redundant connections to I/O drawers 16, which are interconnected in a loop configuration in order to assure uninterrupted power to I/O devices installed in I/O drawers 16. Thus, as long as one of the two power connections for an I/O drawer 16 is present, I/O devices in that I/O drawer 16 will receive power.

Figure 2:
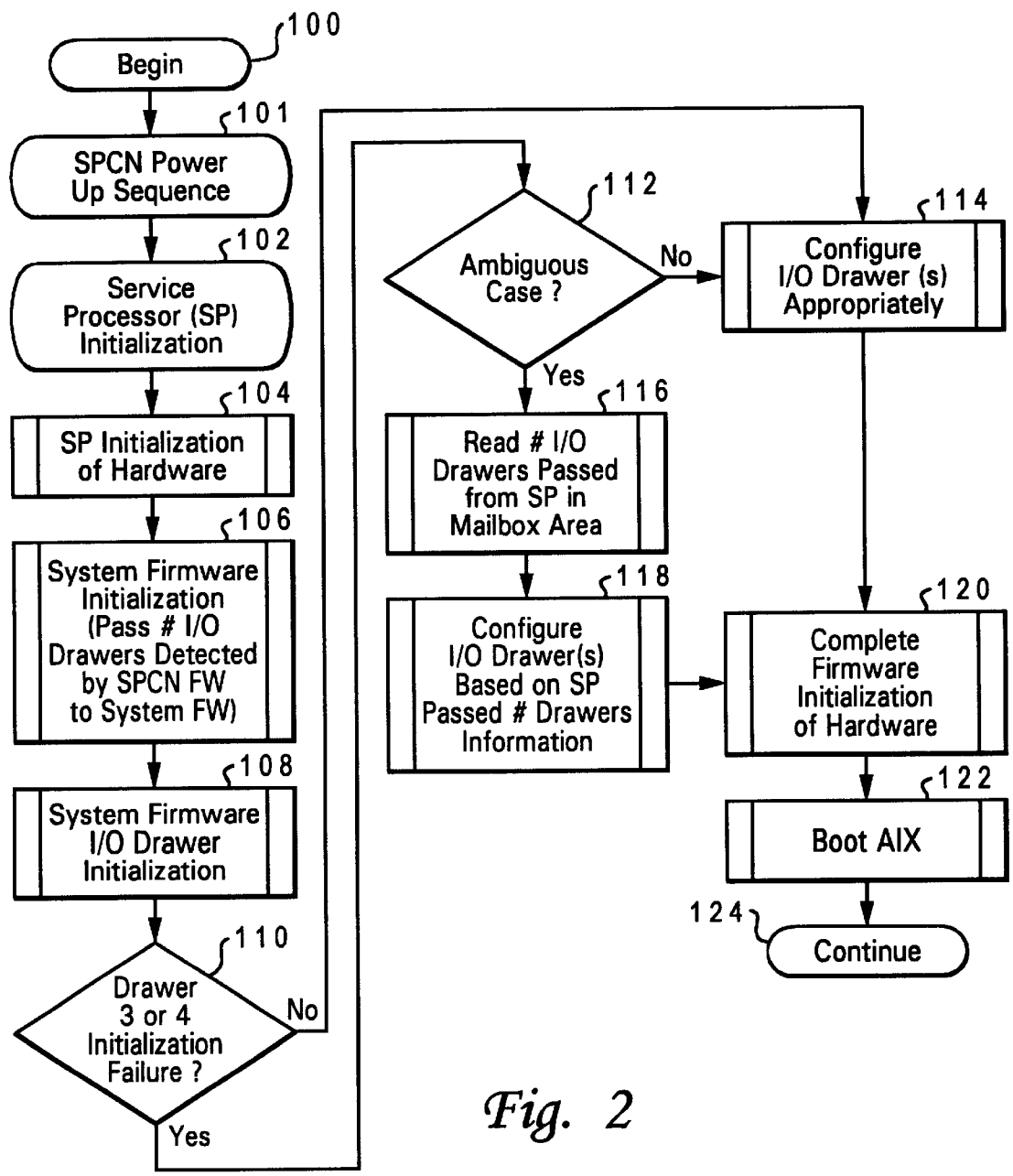
FIG. 2 is a high level logical flowchart of an exemplary method for initializing a data processing system in which system power control information is utilized to resolve configuration ambiguities.

Referring now to FIG. 2, there is depicted a high level logical flowchart of an exemplary method for initializing a data processing system following system power on (or reset) in accordance with the present invention. For ease of illustration, the initialization process has been illustrated in a sequential manner; however, as will be apparent to a person of ordinary skill in the art from the following description, many of the illustrated steps may be performed in a different order than shown in FIG. 2 or may be performed concurrently.

As illustrated, the process begins at block 100 at system power on or reset. At power on, DC power is automatically supplied to SPCN controller 36 by power supply 37. Then, as shown at block 101, a microprocessor within SPCN controller 36 begins to execute power control firmware resident within a memory in SPCN controller 36. This power control firmware causes SPCN controller 36 to supply power to the components of data processing system 10 in the proper sequence. Importantly, the power control firmware stores in SP memory 52 an indication of the components or subsystems present in data processing system 10 that are supplied power by SPCN controller 36. This power information, which includes an indication of how many I/O drawers 16 are supplied power, can be utilized later in the initialization process to resolve configuration ambiguities, as discussed further below.

The process then proceeds from block 101 to block 102, which illustrates the initialization of service processor 50. The initialization of service processor 50 may entail service processor 50 performing certain low level hardware tests, and preferably includes service processor 50 executing firmware stored in SP memory 52 that completes the check of service processor 50. Next, at block 104, the initialization firmware sets the components that were powered up at block 101 to a known, stable state (e.g., reset). In addition, the initialization firmware prepares for subsequent initialization procedures by clearing system memory 34 and loading system firmware into system memory 34 from SP memory 52.

At this point in the initialization process, the responsibility for performing the remainder of the initialization procedures is transferred from service processor 50 to processors 18. Accordingly, as depicted at block 106, one or more processors 18 begin to execute the system firmware from system memory 34 in order to perform the remainder of the initialization procedures, which include a determination of the present hardware configuration of data processing system 10. The hardware configuration of data processing system 10 is defined to include the components present in data processing system 10, the interconnections between the components, and the accessibility of the components to the operating system. As indicated in block 106, the process of transferring control between the initialization firmware executed by service processor 50 and the system firmware executed by processors 18 includes the initialization firmware passing to the system firmware the power information (or a pointer to the power information) indicating the number of I/O drawers 16 detected by the power control firmware.

Next, the system firmware executed by processors 18 commences the remainder of the initialization procedures, including initializing I/O drawers 16, as depicted at block 108. The initialization of I/O drawers 16 entails processors 18 attempting to communicate with an I/O drawer 16 through each of the four ports of I/O hub 32 and an associated primary RIO bus 40. In addition, the system firmware executed by processors 18 verifies that the installed I/O drawers 16 are interconnected in a loop configuration. If the system firmware is unable to communicate with an I/O drawer 16 through a particular port of I/O hub 32 and the associated primary RIO bus 40, the system firmware then attempts to establish communication with the I/O drawer 16, if present, through a secondary RIO bus 46. If communication can be established via a secondary RIO bus 46, the system firmware notes which primary RIO bus 40 is not making proper connection (i.e, is either disconnected or damaged). In addition to checking if I/O drawers 16 are properly installed, the system firmware further checks to determine if communication can be established with each installed I/O device (e.g., LAN adapter, SCSI controller, etc.).

The process proceeds from block 108 to block 110, which illustrates the system firmware determining whether or not it was successful in establishing direct communication with the I/O bridge 42 of an I/O drawer 16 through each of ports 3 and 4 of I/O hub 32. If the system firmware successfully established direct communication with I/O drawers 16c and 16d via ports 3 and 4 of I/O hub 32, the process passes to block 114, which is described below. However, if system firmware was unsuccessful in establishing direct communication with the I/O bridge 42 of an I/O drawer via either port 3 or port 4 of I/O hub 32, the process passes to block 112. Block 112 depicts the system firmware determining whether or not the configuration of I/O drawers 16 is ambiguous, that is, whether it is indeterminate which I/O drawers 16 are installed. The exemplary embodiment of data processing system 10 requires that I/O drawers 16 be installed sequentially, with the I/O drawer containing service processor 50 directly connected to port 1 of I/O hub 32, the second I/O drawer, if any, directly connected to port 2 of I/O hub 32, etc. Thus, an ambiguous configuration can arise when direct communication is established with an I/O drawer 16 through a port of I/O hub 32 without establishing direct communication with another I/O drawer 16 through a lower numbered port. This first ambiguous case can occur if primary RIO bus 40c is damaged or not connected to I/O drawer 16c, communication is established with I/O drawer 16d via primary RIO bus 40d, and secondary RIO bus 46b is damaged or not connected between I/O drawers 16c and 16d. As a result, it is not clear whether I/O drawer 16d is merely attached incorrectly and I/O drawer 16c is absent, or whether I/O drawer 16c is present but not properly connected. An ambiguous configuration can similarly arise if no direct communication is established with an I/O drawer via port 4 of I/O hub 32 and communication with I/O bridge 42 of I/O drawer 16c can only be established via primary RIO bus 40c. In this second case, it is ambiguous whether or not I/O drawer 16d is intended to be installed.

In response to a determination at block 112 that the hardware configuration is not ambiguous, the system firmware configures each I/O drawer 16 that is installed in data processing system 10, as depicted at block 114. For example, the configuration step illustrated at block 114 assigns PCI addresses to each installed PCI device and defines for each PCI controller 44 what type of PCI device, if any, is installed in each of its PCI slots. The process then passes to block 120, which is described below.

Returning to block 112, in response to a determination that the hardware configuration of data processing system 10 is ambiguous, the process passes to block 116, which illustrates the system firmware reading from a "mailbox" area in system memory 34 the power information passed by the initialization firmware executed by service processor 50. In response to reading this power information, which indicates the number of I/O drawers 16 that are being supplied power, the system firmware configures the I/O drawers present in data processing system 10 based on the power information, as shown in block 118. Thus, for example, the system firmware includes in the hardware configuration each I/O drawer 16 that is supplied power by SPCN controller 36, regardless of whether or not communication was established with each I/O drawer 16. Thus, in contrast to prior art systems in which installed but improperly connected components were omitted from the configuration and therefore inaccessible to the operating system, the system firmware includes in the configuration all detected components whether or not they are properly installed. In addition, the system firmware displays specific error messages to the user to indicate which of primary RIO buses 40a–40d and secondary RIO buses 46a–46b do not have proper connections. As a result, if the improper connections noted in the error message are subsequently remedied by a user, the operating system will be able to access all installed components of data processing system 10.

Following either block 114 or block 118, the process passes to block 120, which illustrates the system firmware completing the initialization of hardware within data processing system 10 by resetting each PCI controller 44 such that a PCI storage device containing the operating system of data processing system 10 can be accessed. The system firmware then boots the operating system, such as Advanced Interactive executive (AIX) available from International Business Machines of Armonk, N.Y., from the PCI storage device. Thereafter, the initialization process terminates at block 124, where data processing system 10 continues operation under the control of the operating system executed by processors 18.

As has been described, the present invention provides an improved method and system for initializing a data processing system. In accordance with the present invention, information from a power control network regarding the components present in the data processing system is utilized to resolve ambiguities in the configuration of the data processing system.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to specific "method steps" implementable by a computer system, those skilled in the art will appreciate from the foregoing description that the present invention may also be embodied as a computer program product for use with a computer system. Those skilled in the art should readily appreciate that programs defining the functions of the present invention can be delivered to a computer via a variety of electronic media, which include without limitation: (a) information permanently stored on non-writable storage media (e.g., CD-ROM); (b) information alterably stored on writable storage media (floppy diskettes, hard disk drives, or computer memory); and (c) information conveyed to a computer through a communication medium, such as a computer or telephone network.

What is claimed is:

1. A method of configuring a data processing system, said method comprising:

supplying power to components of the data processing system;

collecting information regarding which components are supplied power;

initializing components of the data processing system to establish a configuration; and in response to an ambiguity in said configuration as to which hardware components are installed in said data processing system, resolving said ambiguity utilizing said information regarding which components of said data processing system are supplied power.

2. The method of claim 1, and further comprising detecting an ambiguity in said configuration in response to an inability to establish communication with a component of the data processing system.

3. The method of claim 1, said method further comprising detecting an ambiguity in said configuration in response to an inability to establish communication with a component of the data processing system via multiple paths.

4. The method of claim 1, wherein initializing components of the data processing system comprises initializing input/output components of the data processing system.

5. The method of claim 1, wherein initializing components of the data processing system comprises executing software with a service processor of the data processing system to perform said initialization.

6. The method of claim 5, wherein:

initializing components of the data processing system comprises executing software using central processing resources of the data processing system; and said method further comprises communicating said information regarding which components of the data processing system are supplied power from said software executed by said service processor to said software executed by said central processing resources.

7. The method of claim 1, and further comprising:

thereafter, booting an operating system of the data processing system.

8. A data processing system, comprising:

a plurality of components;

a power control network that initiates supply of power to said plurality of components, said power control network collecting information regarding which components are supplied power;

processing resources; and a memory that contains initialization firmware that, when executed by said processing resources, initializes said plurality of components to establish a configuration, wherein said initialization firmware resolves an ambiguity in said configuration as to which hardware components are installed in said data processing system utilizing said information collected by said power control network.

9. The data processing system of claim 8, wherein said initialization firmware detects an ambiguity in said configuration in response to an inability to establish communication with a component of the data processing system.

10. The data processing system of claim 8, wherein said initialization firmware detects an ambiguity in said configuration in response to an inability to establish communication with a component of the data processing system via multiple paths.

11. The data processing system of claim 8, wherein said plurality of components comprise input/output components of the data processing system.

12. The data processing system of claim 8, wherein said processing resources comprise both a service processor and central processing resources.

13. The data processing system of claim 12, and further comprising a communication path that communicates said information regarding which components of the data processing system are supplied power from firmware executed by said service processor to firmware executed by said central processing resources.

14. The data processing system of claim 13, wherein said firmware executed by said central processing resources boots an operating system after establishing said configuration.

15. A program product usable by a data processing system having a plurality of components, said program product comprising:

a computer readable medium;

instruction means, within said computer readable medium, for causing the data processing system to obtain information regarding which components among said plurality of components are supplied power;

instruction means, within said computer readable medium, for causing a data processing system to initialize components of the data processing system to establish a configuration; and instruction means, within said computer readable medium, for causing said data processing system to resolve an ambiguity in said configuration as to which hardware components are installed in said data processing system utilizing said information regarding which components of said data processing system are supplied power.

16. The program product of claim 15, and further comprising instruction means, within said computer readable medium, for detecting an ambiguity in said configuration in response to an inability to establish communication with a component of the data processing system.

17. The program product of claim 15, and further comprising instruction means, within said computer readable medium, for detecting an ambiguity in said configuration in response to an inability to establish communication with a component of the data processing system via multiple paths.

18. The program product of claim 15, wherein said instruction means for initializing components of the data processing system comprises instruction means for initializing input/output components of the data processing system.

19. The program product of claim 15, and further comprising:

instruction means, within said computer readable medium, for thereafter booting an operating system of the data processing system.

* * * * *